July 21 1925.
H. M. SILVER
RADIUS ROD HANGER
Filed Sept. 7, 1922
1,546,759
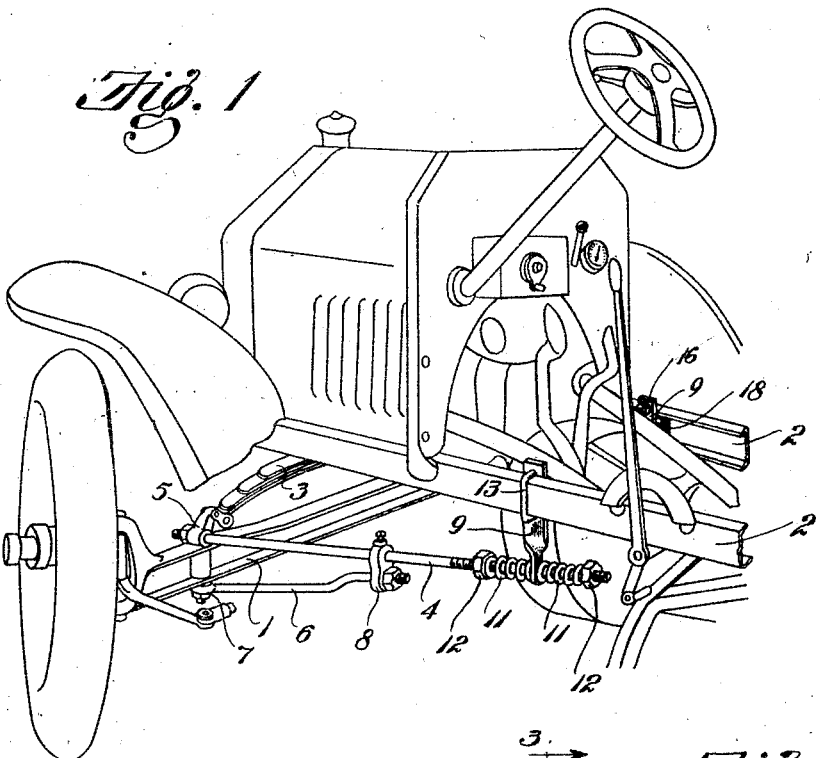
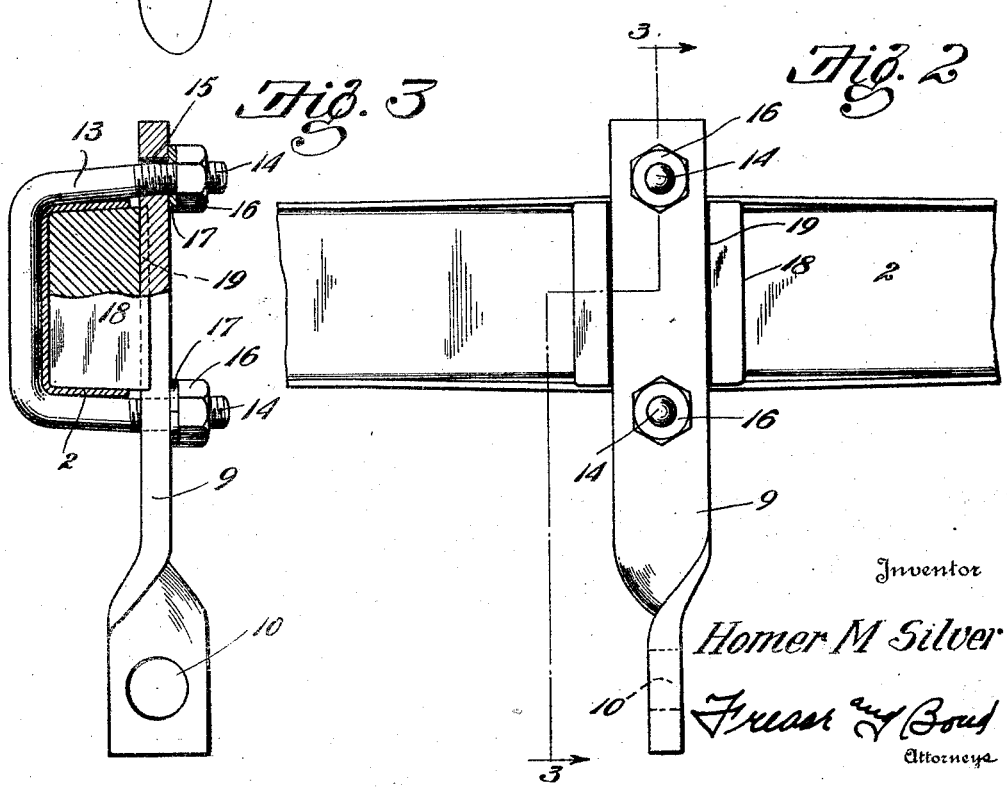
Inventor
Homer M Silver
Attorneys Patented July 21, 1925.

1,546,759

UNITED STATES PATENT OFFICE.

HOMER M. SILVER, OF SALEM, OHIO, ASSIGNOR TO THE SILVER MANUFACTURING COMPANY, OF SALEM, OHIO, A CORPORATION OF OHIO.

RADIUS-ROD HANGER.

Application filed September 7, 1922. Serial No. 586,632.

*To all whom it may concern:*

Be it known that I, HOMER M. SILVER, a citizen of the United States, residing at Salem, in the county of Columbiana and State of Ohio, have invented a new and useful Radius-Rod Hanger, of which the following is a specification.

The invention relates to a hanger or support for automobile radius rods such as are provided for connecting the axles with the frame and the objects of the invention are to provide a hanger of this character arranged to support one end of the radius rod from a channel of the frame, means being provided for connecting the support to the channel in such a manner that it will be rigidly held against movement upon the channel so that it cannot shift from its original position.

The above and other objects may be attained by providing a wedge block arranged to engage one side of the hanger, a yoke bolt being located around the channel and connected to the hanger for wedging the block into the channel for the purpose of spreading the channel, thus providing an attachment which will be absolutely rigid.

An embodiment of the invention is illustrated in the accompanying drawing, in which—

Figure 1 is a perspective view of a portion of an automobile provided with a radius rod showing the improved hanger applied thereto;

Fig. 2, a side elevation on an enlarged scale of the hanger showing the same attached to the channel frame member; and Fig. 3, a transverse, sectional view on the line 3—3, Fig. 2.

Similar numerals of reference indicate corresponding parts throughout the drawing.

The front axle of an automobile is represented at 1 and the side bars of the chassis at 2, the same being shown as channel bars in the drawing. An elliptic or semi-elliptic spring 3 is commonly used in certain types of automobiles to support the front end of the chassis from the front axle. With a construction of this kind, radius rods are necessary to properly connect the chassis with the front axle as the spring is not capable of sustaining transverse strains.

The radius bar is shown at 4 and the forward end thereof may be connected to the axle in any suitable manner, as illustrated at 5. A supplementary rod 6 is shown connected at its forward end to the front axle at a point adjacent the connection of the radius rod as shown at 7. The other end of the rod 6 is secured to the main radius rod as by the hanger 8.

The rear end of the radius rod is yieldably connected to the hanger 9 which is supported upon the channel frame 2, the rod extending slidably through an eye 10 in the lower end of the hanger, springs 11 surrounding the rod upon each side of the hanger and engaging stops such as the nuts 12, which are spaced upon the rod upon opposite sides of the hanger.

The hanger 9 is connected to the channel frame 2 by means of a yoke bolt 13 which surrounds the channel frame, the threaded extremities 14 thereof extending through suitable apertures 15 in the hanger, nuts 16 and lock washers 17 being preferably provided thereon.

A wedge block 18 is forced into the channel frame and provided upon its outer face with the groove 19 which receives the adjacent face of the hanger. Thus as the nuts 14 are tightened, the wedge block is forced into the channel frame, spreading the side walls thereof as shown in Figs. 2 and 3.

It will be obvious that since the casting is slightly thicker than the depth of the channel, the pressure exerted upon the hanger by means of tightening the nuts on the yoke bolt, will force the wedge block tightly into the channel frame as the side walls thereof are spread, thus preventing any sliding movement of the hanger with reference to the channel frame, holding the hanger rigidly in its original position.

Although the device has been described and illustrated as a support for a radius rod, it will be understood that the hanger may be utilized for attaching bumpers or the like, without changing the construction of the hanger per se, as the hanger itself may be applied to a channel frame and used as a support for any device.

I claim:—

1. The combination with a channel frame of a block extending entirely into the channel and protruding therefrom, a hanger engaging the outer surface of the block and spaced from the channel and a yoke bolt surrounding the channel and secured to the hanger.

2. The combination with a channel frame of a wedge block extending entirely into the channel and protruding therefrom, a hanger engaging the outer surface of the block and spaced from the channel and a yoke bolt surrounding the channel and secured to the hanger, and arranged to force the wedge block into the channel and spread the side walls thereof.

3. The combination with a channel frame of a wedge block extending entirely into the channel and protruding therefrom and provided with a groove upon its outer face, a hanger engaging said groove, and a yoke bolt surrounding the channel and secured to the hanger, and arranged to force the wedge block into the channel and spread the side walls thereof.

4. The combination with a channel frame of a block extending entirely into the channel and protruding therefrom, a hanger engaging the outer surface of the block and spaced from the channel, a yoke bolt surrounding the channel and secured to the hanger, an axle, and a radius bar connected to the axle and having one end slidably connected to the hanger.

5. The combination with a channel frame of a wedge block extending entirely into the channel and protruding therefrom, a hanger engaging the outer surface of the block and spaced from the channel, a yoke bolt surrounding the channel and secured to the hanger, and arranged to force the wedge block into the channel and spread the side walls thereof, an axle, and a radius bar connected to the axle and having one end slidably connected to the hanger.

6. The combination with a channel frame of a wedge block extending entirely into the channel and protruding therefrom and provided with a groove upon its outer face, a hanger engaging said groove, a yoke bolt surrounding the channel and secured to the hanger and arranged to force the wedge block into the channel and spread the side walls thereof, an axle, and a radius bar connected to the axle and having one end slidably connected to the hanger.

HOMER M. SILVER.